United States Patent [19]

Tagami

[11] Patent Number: 4,478,306
[45] Date of Patent: Oct. 23, 1984

[54] RADIATOR MOUNTING MECHANISM

[75] Inventor: Tomoyuki Tagami, Saitama, Japan

[73] Assignee: Honda Giken Kogyo Kabushiki Kaisha, Tokyo, Japan

[21] Appl. No.: 392,203

[22] Filed: Jun. 25, 1982

[30] Foreign Application Priority Data

Jul. 3, 1981 [JP] Japan .................................. 56-103262

[51] Int. Cl.³ ............................................ B60K 11/04
[52] U.S. Cl. ..................................... 180/229; 165/41; 248/232
[58] Field of Search ..................... 180/229, 219, 68 R, 180/54 A; 165/41, 77, 78; 248/232

[56] References Cited

U.S. PATENT DOCUMENTS 4,016,945  4/1977  Shibata .................................. 180/229
4,066,119  1/1978  Stedman ........................... 180/68 R

FOREIGN PATENT DOCUMENTS 21657     1/1981  European Pat. Off. .
55-78122  6/1980  Japan ................................... 180/229
57-140224 8/1982  Japan ................................... 180/229

Primary Examiner—Joseph F. Peters, Jr.
Assistant Examiner—D. Lynn Fugate
Attorney, Agent, or Firm—Sughrue, Mion, Zinn, Macpeak & Seas

[57] ABSTRACT

A radiator mounting mechanism for a motorcycle provided with a water-cooled engine. A pair of radiators are positioned below a fuel tank and are movably supported to a frame by means of the radiator mounting mechanism. The mechanism includes a guide means for guiding the movement of the radiators, and a fixing means for releasably fix the radiator at a desired position relative to the frame.

5 Claims, 13 Drawing Figures

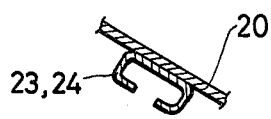
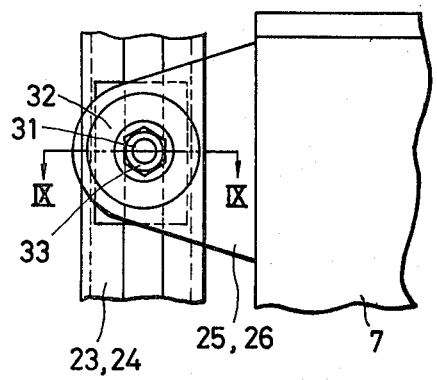
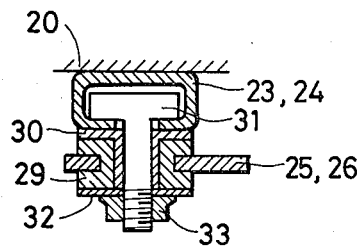
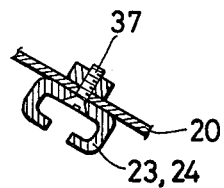
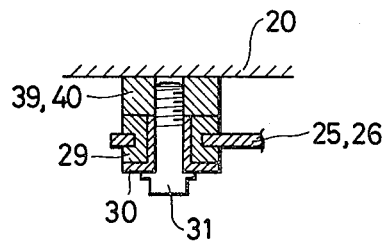

RADIATOR MOUNTING MECHANISM

BACKGROUND OF THE INVENTION

The present invention relates to a radiator mounting mechanism for a motorcycle, which is enabled to freely shift and fix the radiator at a desired position.

In a motorcycle equipped with a water-cooled engine, a radiator is mounted on the body of the motorcycle while taking the following three conditions into consideration:

1. The radiator is disposed at such a position as to have excellent ventilation and an advantage in cooling capacity;
2. The radiator is positioned close to the center of gravity of the motorcycle body so as to have an advantage in steerage and stability; and
3. The radiator is positioned so that it can be easily protected against mud or pebbles during an off-road running operation.

Especially for the on-road and off-road running operations of an off-road motorcycle, the conditions 1 and 3 and the condition 2, as have been specified in the above, are contradictory to each other so that they are difficult to simultaneously satisfy and cannot always suit the various course conditions in the running operation and tastes of the rider.

SUMMARY OF THE INVENTION

The present invention relates to improvements in a motorcycle overcoming the aforementioned difficulty and has an object to provide a motorcycle which is enabled to freely adjust the mounting position of a radiator in accordance with the course conditions and the taste of the rider.

The motorcycle generally provides a frame, water-cooled engine, radiator connected to the engine through a tubular member. The frame includes an obliquely extending head pipe, a main pipe extending along the travel direction of said motorcycle and having a front end integrally fixed to the head pipe, a down tube having an upper end integrally fixed to the head pipe, and a pipe member extending between the main pipe and the down tube. The above object of the subject invention will be attained by providing a means for controlling a position of the radiator relative to the frame. The control means comprises a guide means for guiding the movement of the radiator and a fixing means for fixing the position of the radiator upon completion of the manual position control thereof.

According to a first embodiment of the present invention, the guide means includes upper and lower linear members each having C-shaped channels in cross-section. The upper linear member is fixed to and extends between the main pipe and the down tube and the lower linear member is fixed to and extends between the pipe member and the down tube. The fixing member includes two pairs of bolts and nuts. Each of the bolts has a head slidably fitted within the C-shaped channel and has a stem supporting the radiator. The stem is formed with a thread to engage the nut to thereby releasably support the radiator. One pair of the nuts and bolts is connected to an upper end of the radiator to cooperate with the upper linear member, while the other pair is connected to a lower end of the radiator to cooprate with the lower linear member.

According to a second embodiment of the invention, instead of the C-shaped channels of the linear members, the linear members are formed with threaded holes arranged at an equal distance with one another along the longitudinal direction thereof. The radiator has upper and lower portions provided with threads adapted to selectively engage one of said threaded holes of the linear members.

According to a third embodiment of the invention, the guide means includes a supporting rod pivotally suspended from the main pipe. The supporting rod is formed with a slot. The guide means further includes upper and lower links pivotally secured to the main pipe. Front ends of the upper and lower links are pivotally connected to upper and lower portions of the radiator. The fixing means includes a nut and bolt, the latter extending through the slot of the supporting rod, said front end of the upper link and the upper portion of the radiator.

BRIEF DESCRIPTION OF THE DRAWINGS

In the drawings:

FIG. 7 is a transverse section taken along line VII—VII of FIG. 6;

FIG. 8 is an enlarged section showing the radiator mounting portion;

FIG. 9 is a transverse section taken along line IX—IX of FIG. 8;

FIG. 10 is a transverse section showing an essential portion of another embodiment;

FIG. 12 is a transverse section showing an essential portion of the same; and

DETAILED DESCRIPTION OF THE PREFERRED EMBODIMENTS

Figure 1:
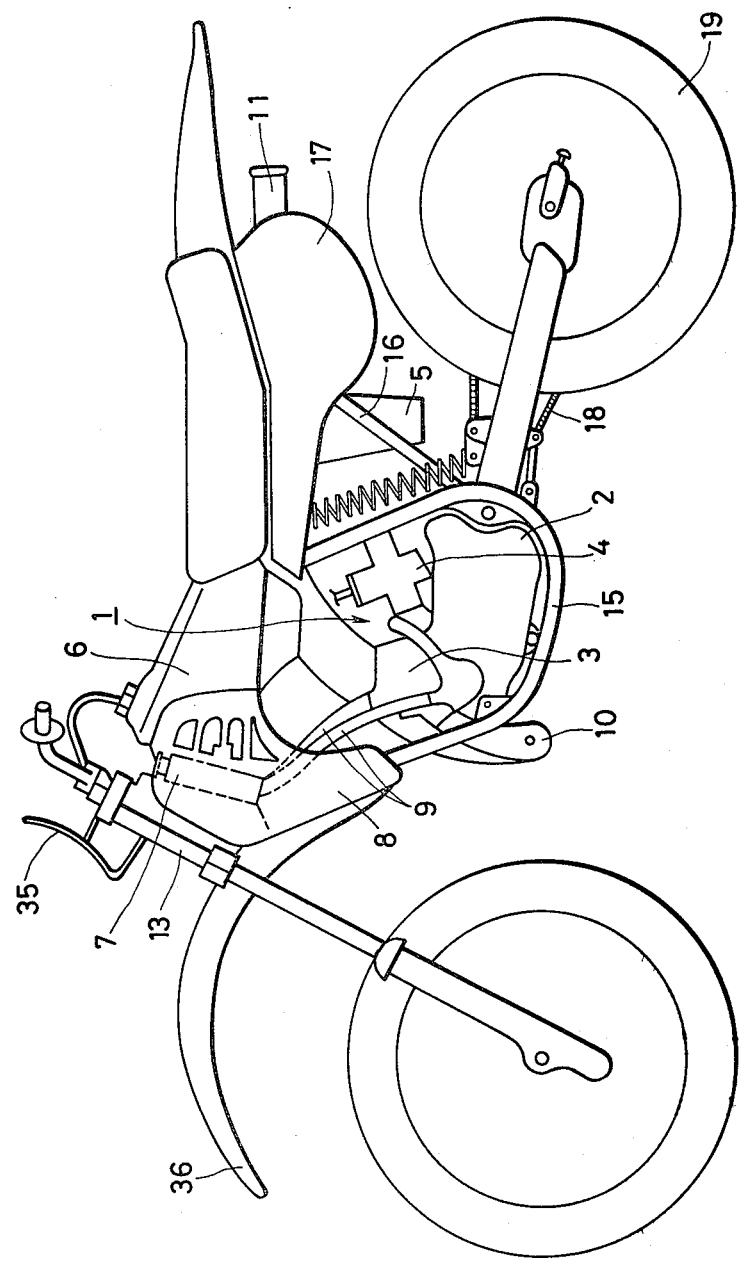
FIGS. 1 to 3 are side elevations showing one embodiment of the radiator mounting mechanism for a motorcycle according to the present invention and corresponding to the states, at which the radiators are set at their highest, intermediate and lowest positions, respectively.

The present invention will now be described with reference to the accompanying drawings.

A water-cooled two-cycle engine 1 for an off-road motorcycle has a clutch and a transmission built in its crankcase 2. The transmission has an output shaft coupled to a drive sprocket (not shown) connected through a chain 18 to the final driven sprocket (not shown) of a rear wheel 19, so that the output power of the engine 1 is transmitted to the rear wheel.

At a rear side of a cylinder block 3 of the engine 1, moreover, a carburetor 4 and an air cleaner 5 are consecutively arranged so that the air filtered by the air cleaner 5 is mixed with a fuel by the carburetor 4, and the resultant mixture is fed to the engine 1.

Still moreover, a fuel tank 6 arranged above the engine 1 has its lower front portion recessed from both transversal sides toward its center (generally inverted V-shaped recess) so that a pair of right and left radiators 7 are so mounted in the resultant spaces that they can be vertically movable.

Furthermore, the aforementioned radiators 7 are covered with radiator covers 8 and connected with each other and with the engine 1 through hoses 9 made of rubber so that the heat generated by the engine 1 is radiated in the radiators 7 by the cooling water which is circulated in the engine 1 and the radiators 7 through the water hoses 9.

An expansion chamber 10 has a base and is detachably secured to the generally center front of the cylinder block 3 of the engine 1, and has its leading end coupled to a silencer 11 so that the exhaust system inertia effect and the silencing effect can be achieved by the expansion chamber 10 and the silencer 11.

On the other hand, the engine 1 is mounted on a cradle type frame 12, which is constructed to include: a head pipe 13; a main pipe 14 having its leading end integrally fixed to the head pipe 13; a down tube 15 having its upper end integrally fixed to the head pipe 13; a pair of right and left side rails (although not shown) integrally fixed to the rear end of the main pipe 14; and a pair of right and left back stays 16 each having both ends integrally fixed to the down tube 15 and the side rails. Furthermore, side covers 17 are mounted on the side rails.

Figure 4:
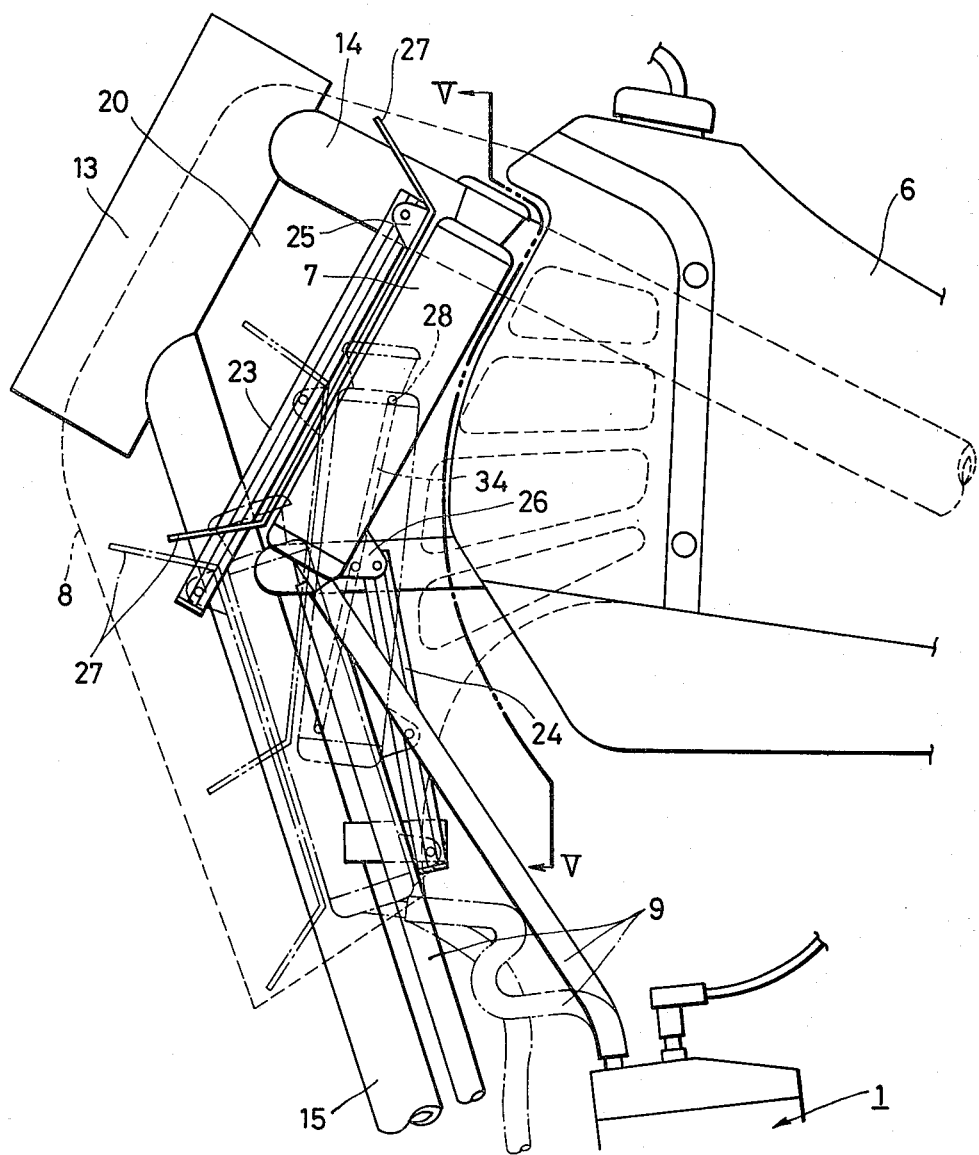
FIG. 4 is an enlarged side elevation showing an essential portion at a state having the radiator covers removed.
Figure 6:
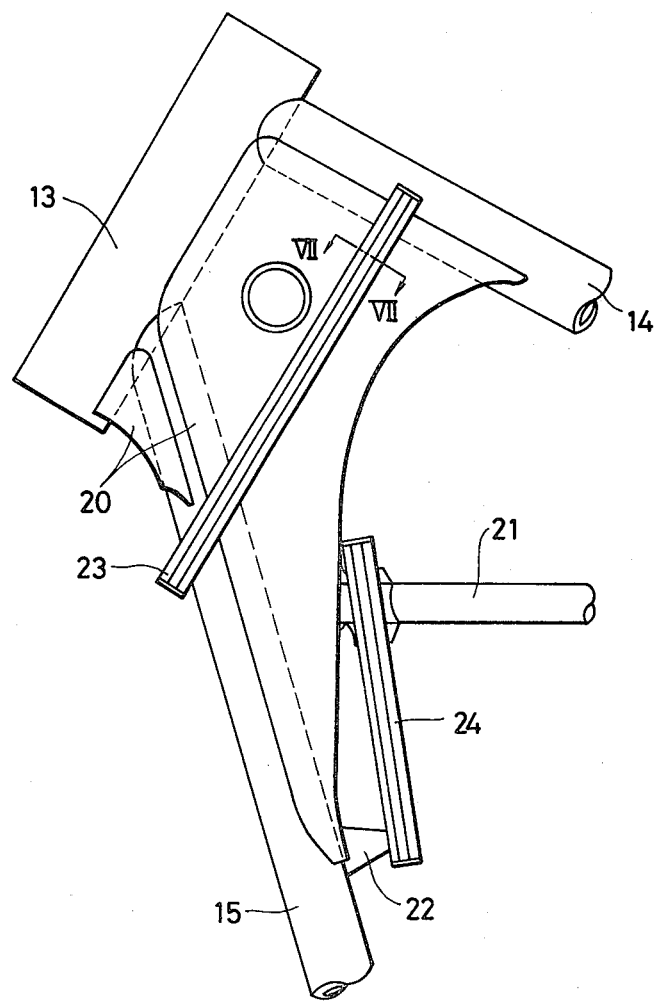
FIG. 6 is an enlarged sectional view showing an essential portion at a state having the radiators of FIG. 4 removed.

Now, the head pipe 13, the main pipe 14 and the down tube 15 thus far described are integrally reinforced, as shown in FIGS. 4 and 6, by means of a stay 20. An upper rail 23 having a C-channel-shaped cross-section is integrally welded on a common plane flush with the main pipe 14, the down tube 15 and the stay 20. Further, a lower rail 24 having a C-channel-shaped cross-section is integrally welded to both the sides of a pipe 21 and a rail mounting stay 22. The pipe 21 extends between the down tube 15 and the main pipe 14, and a rail mounting stay 22 is protruded rearwardly from the down tube 15.

As shown in FIGS. 7 to 9, a rubber member 29 and a collar 30 are fitted in stays 25 and 26 integrally protruded at both the upper and lower ends of the aforementioned radiators 7, and a bolt 31 having its head slidingly fitted in the aforementioned rails 23 and 24 is inserted into the aforementioned collar 30 and has its protrusion screwed by a nut 33 through a washer 32. The stays 25 and 26 of the aforementioned radiators 7 can be firmly fixed to the rails 23 and 24 by fastening the nut 33.

Figure 5:
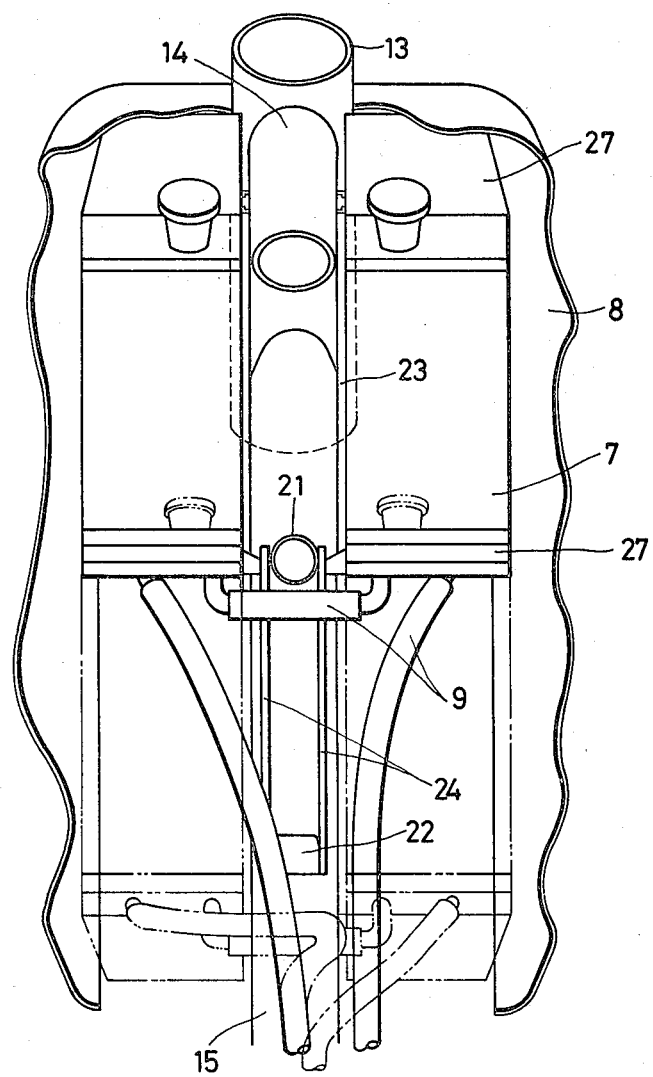
FIG. 5 is a view taken in the direction of arrows V—V of FIG. 4.

Moreover, air flow guide plates 27 are provided to protrude forward from both the upper and lower ends of the radiators 7 such that their outer edges are held in contact with and supported by the radiator covers 8 (FIG. 5).

Furthermore, pins 28 (FIG. 4) are provided to protrude from the outer sides of and adjacent to the center of gravity of the radiators 7 and are fitted on guide rails 34 which are mounted on the inner sides of the radiator covers 8.

Since the embodiment shown in FIGS. 1 to 9 has the construction thus far described, the changing operation of the mounting position of the radiators 7 may be conducted by removing the radiator covers 8 to loosen the nuts 33, thereby suitably shifting the radiators 7 up and down along the guide rails 23 and 24, and thereafter, fastening again the nuts 33 and attaching the radiator covers 8.

As a result, in the case of the off-road running operation undertaking a bad course condition under which the mud is liable to be splashed by a rainy weather or under which there exist so many pebbles, the radiators 7 are shifted to and fixed at their upper positions, as shown in FIG. 1. Then, the radiators 7 are directed obliquely upward and located at a distance from the ground so that they are less attacked by the splash of the mud and by the shocks of the pebbles so that they can be protected thereagainst.

Figure 2:
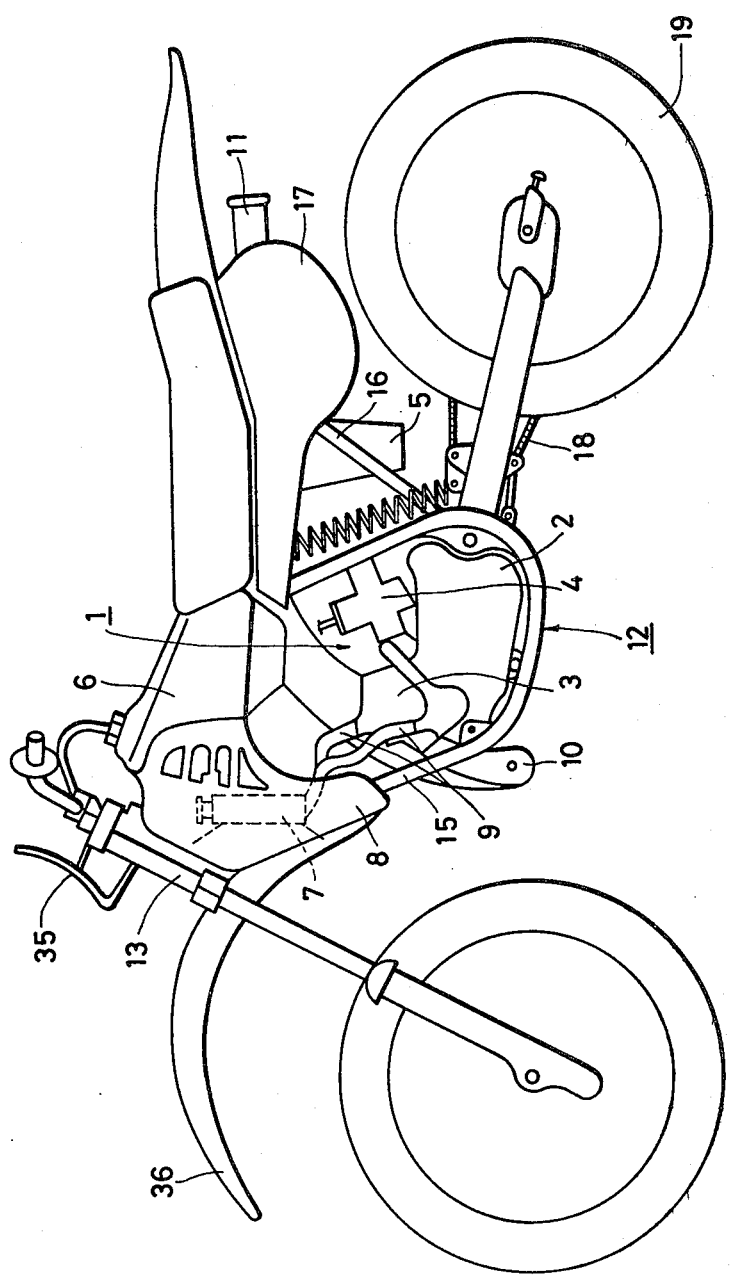
Figure 3:
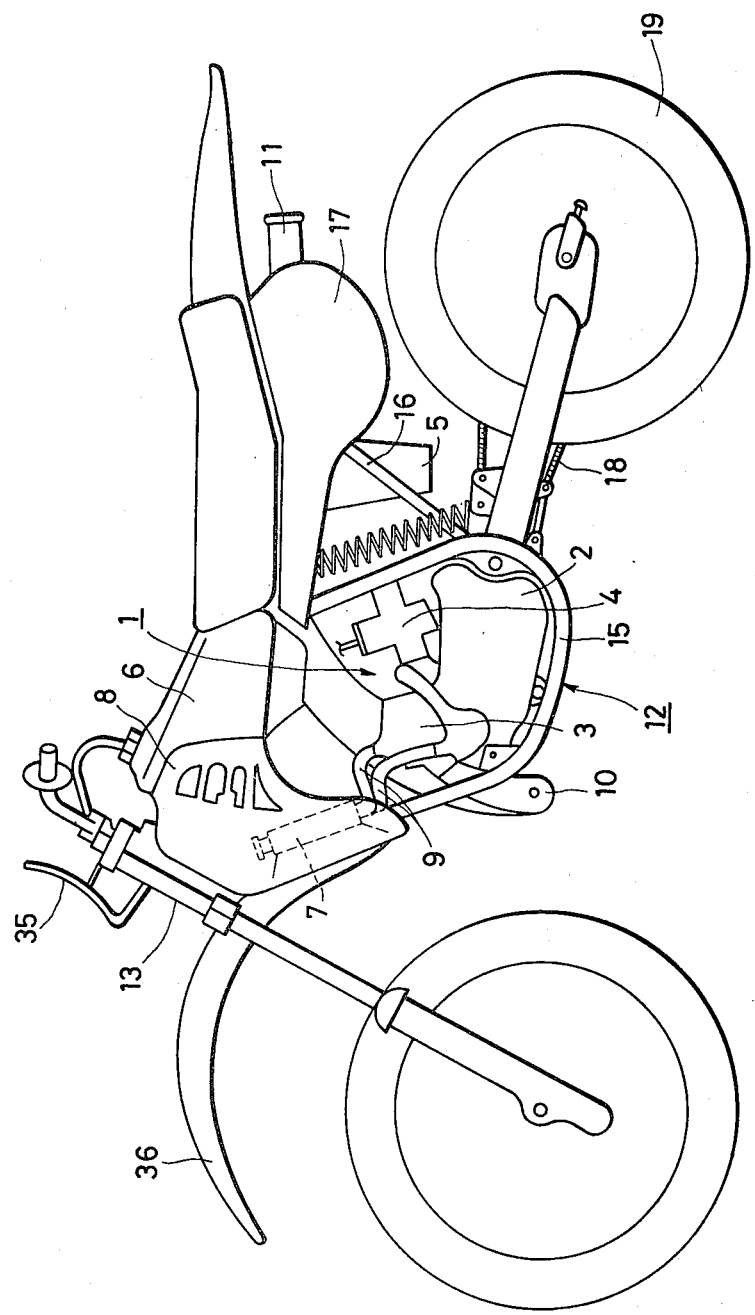

On the other hand, either in the case of the on-road or off-road running operation undertaking a relatively satisfactory course condition under which there exist less mud and pebbles, the radiators 7 are fixed at such intermediate or lower positions as shown in FIGS. 2 or 3. Then, the radiators 7 are located close to the center of gravity of the motorcycle body to invite an advantage in steerage and stability.

Moreover, the radiators 7 can be suitably shifted to positions to suit the taste of the rider by moving the mounting positions to radiators up and down in accordance with the rider's comfort.

Thus, in the embodiment shown in FIGS. 1 to 9, the mounting positions of the radiators 7 can be shifted without any difficulty in accordance with the necessity or taste of the rider.

In the embodiment shown in FIGS. 1 to 9, the rails 23 and 24 are welded, so that they also serve as the reinforcing members for the frame 12, to the main pipe 14, the down tube 15, the stay 20, the pipe 21 and the rail mounting stay 22. However, unless the rails 23 and 24 are used as the reinforcing members, rails 23 and 24 made of aluminum may be fixed to the stay 20 and so on by means of screws 37 as shown in FIG. 10 so that the resultant weight can be reduced.

Figure 11:
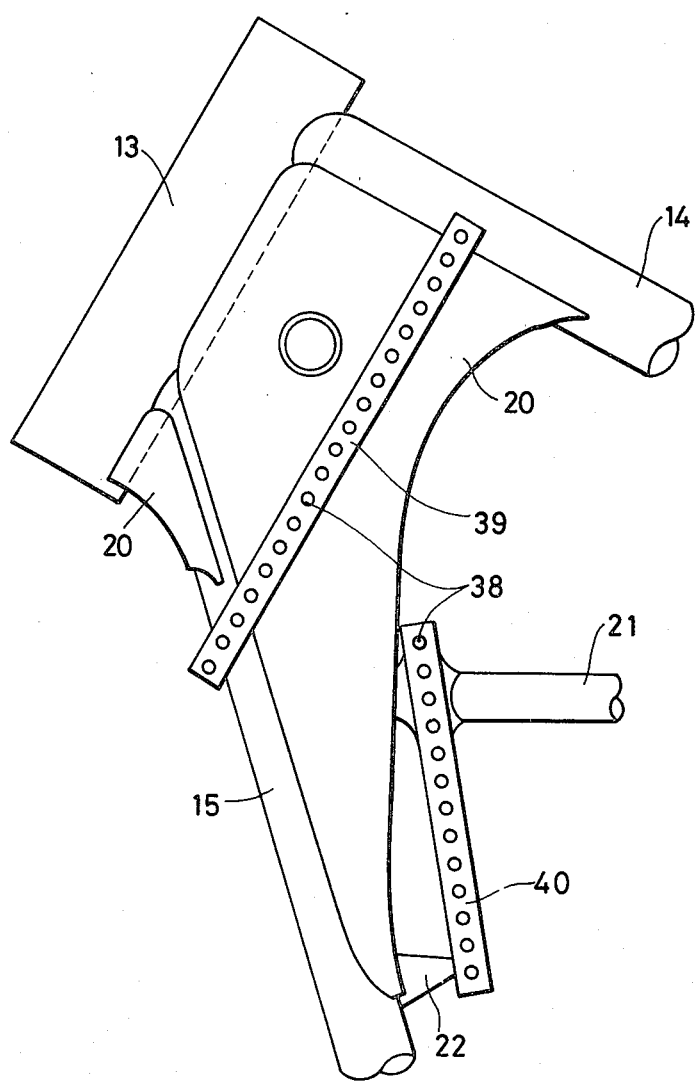
FIG. 11 is an enlarged side elevation showing an essential portion of still another embodiment.

In the foregoing embodiment, moreover, the slide rails 23 and 24 are used as means for guiding and supporting the radiators 7. As shown in FIGS. 11 and 12, however, two plates 39 and 40 are fixedly secured to the frame 12 by, for example, welding. These plates are formed with a number of female threads arranged at a predetermined interval in the longitudinal directions. According to this modified embodiment, since the radiators 7 are firmly fixed by means of the holes 38, they can be absolutely prevented from any displacement due to the vibrations or shocks accompanying the running operation.

Figure 13:
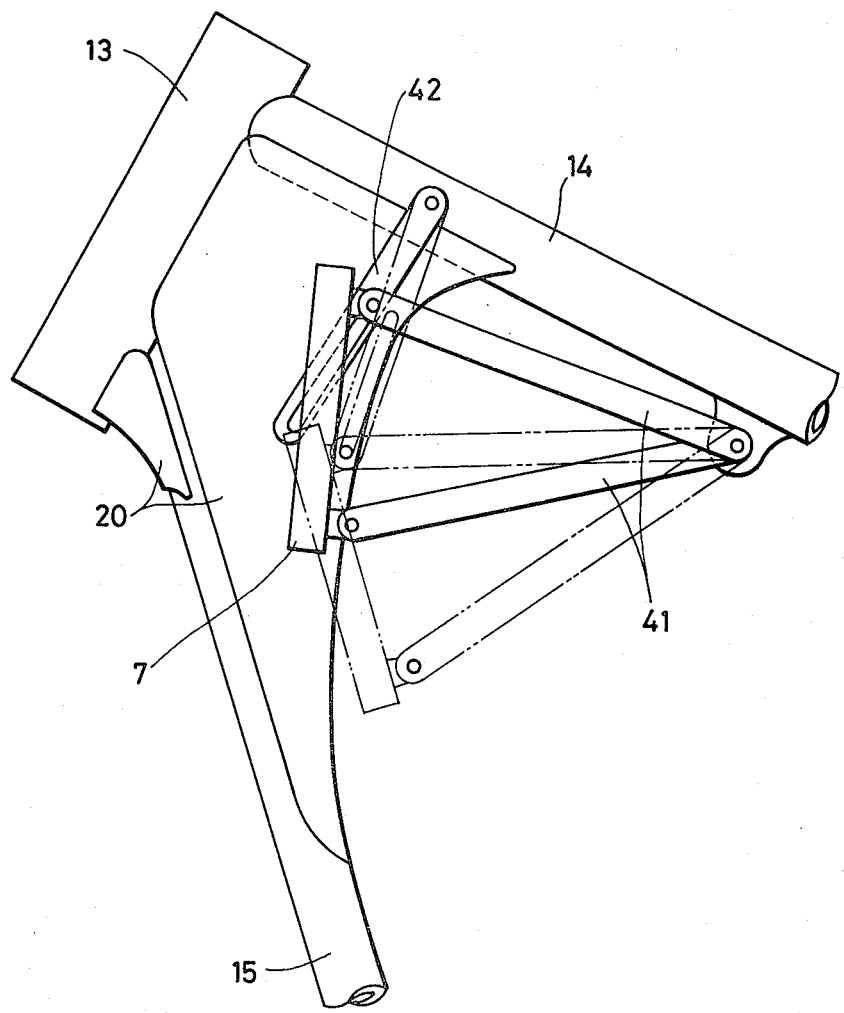
FIG. 13 is a schematic view showing a further embodiment.

As shown in FIG. 13, furthermore, the radiators 7 may be so hinged by means of two pairs of upper and lower links 41 as to rock up and down and may be supported by means of supporting rods 42, which are pivotably suspended from the main pipe 14, and by means of bolts and nuts (although not shown).

The supporting rod 42 is formed with a slot. The free end of the upper link is slidably engaged with the slot and can be fixed thereto by the bolt and nut. The free end of the upper link is also connected to the upper portion of the radiator. The lower link is connected to a lower portion of the radiator 7.

Furthermore, although the engine 1 and the radiators 7 are connected by means of the flexible water hoses 9, they may be connected by means of a plurality of pipes which are equipped with such universal joints as can be freely rotated relative to each other.

As has been described hereinbefore, according to the present invention, there is provided a radiator mounting mechanism for a motorcycle equipped with a liquid-cooled engine, which mechanism comprises: the radiators; the pipes connecting said liquid-cooled engine and said radiators; the guiding and supporting means for guiding and supporting said radiators in a freely shiftable manner; and the fixing means for fixing said radiators at predetermined positions. As a result, if the aforementioned fixing means is loosened and is fastened again after the aforementioned radiators have been shifted to the predetermined positions, then the radiators can be selectively fixed at the most proper positions in accordance with the course condition and the taste of the rider without any modification of the motorcycle.

Although the present invention has been described in detail in connection with the embodiments shown in the accompanying drawings, it should not be limited to those embodiments but can have its design suitably freely modified, if necessary, within a range not exceeding the spirit of the present invention.

What is claimed is:

1. A radiator mounting mechanism for a motorcycle, said motorcycle having a frame, a water-cooled engine, and a radiator connected to said engine through a tube to cool said engine, said radiator having a plurality of positions relative to said frame, said mounting mechanism comprising adjusting means for selectively placing said radiator in said plurality of positions relative to said frame; wherein said adjusting means comprises a guide means for guiding the movement of said radiator to any one of said plurality of positions, and a fixing means to fix the position of said radiator at any one of said plurality of positions; and wherein said frame includes an obliquely extending head pipe, a main pipe extending along travel direction of said motorcycle and having a front end integrally fixed to said head pipe, a down tube having an upper end integrally fixed to said head pipe, and a pipe extending between said main pipe and said down tube, and wherein said guide means comprises an upper linear member fixed to and extending between said main pipe and said down tube, and a lower linear member fixed to and extending between said pipe and said down tube.

2. A radiator mounting mechanism as defined in claim 1, wherein each of said linear members has C-shaped channel in cross-section extending along longitudinal direction thereof, and wherein said fixing means comprises two pairs of bolts and nuts, each of said bolts having a head slidably movable within said C-shaped channel, and a stem supporting said radiator, said stem being formed with a thread to engage said nut to releasably support said radiator, one pair of said bolt and nut being connected to an upper end of said radiator to cooperate with said upper linear member and the other pair being connected to a lower end of said radiator to cooperate with said lower linear member.

3. A radiator mounting mechanism as defined in claim 2, further comprising a stay member fixedly secured to said main pipe, said head pipe and said down tube, said upper linear member being welded to said main pipe, said down tube and said stay being disposed in a common plane.

4. A radiator mounting mechanism as defined in claim 1, wherein each of said upper and lower linear members is formed with thread holes arranged at equal distance along longitudinal direction thereof, and wherein said radiator has upper and lower portions provided with threads adapted to selectively engage one of said thread holes of said linear members.

5. A radiator mounting mechanism for a motorcycle, said motorcycle having a frame, a water-cooled engine, and a radiator connected to said engine through a tube to cool said engine, said radiator having a plurality of positions relative to said frame, said mounting mechanism comprising adjusting means for selectively placing said radiator in said plurality of positions relative to said frame; wherein said adjusting means comprises a guide means for guiding the movement of said radiator to any one of said plurality of positions, and a fixing means to fix the position of said radiator at any one of said plurality of positions; and wherein said guide means comprises a supporting rod pivotally suspended from a main pipe of said frame, said supporting rod being formed with a slot; upper and lower links pivotally suspended from said main pipe, front ends of said upper and lower links being pivotally connected to upper and lower portions of said radiator, and wherein said fixing means comprises a nut and bolt, said bolt extending through said slot said front end of said upper link and said upper portion of said radiator.

* * * * *